United States Patent [19]

Guha et al.

[11] Patent Number: 6,146,755
[45] Date of Patent: Nov. 14, 2000

[54] HIGH DENSITY MAGNETIC RECORDING MEDIUM UTILIZING SELECTIVE GROWTH OF FERROMAGNETIC MATERIAL

[75] Inventors: Supratik Guha, Yorktown Heights; Arunava Gupta, Valley Cottage, both of N.Y.

[73] Assignee: International Business Machines Corporation, Armonk, N.Y.

[21] Appl. No.: 09/172,657

[22] Filed: Oct. 15, 1998

[51] Int. Cl.$^7$ .......................................................... G11B 5/66
[52] U.S. Cl. .......................... 428/332; 428/336; 428/692; 428/694 T; 428/694 TS; 428/694 ST; 428/900; 427/128; 427/129; 427/130; 204/192.2
[58] Field of Search .................................. 428/692, 694 T, 428/694 TS, 694 ST, 332, 336, 900; 204/192.2; 427/128–130

[56] References Cited

PUBLICATIONS

R.C. De Vries Epitaxial Growth of Ca–O$_2$ Mat. Res. Bul. vol. 1, pp. 83–93, Aug. 8, 1966, Pergamon Press, Inc.
Chou, et. al., "Quantum magnetic disk", Journal of Magnetism and Magnetic Materials 155 (1996) 151–153.
Krauss, et. al., "Nano–compact disks with 400 Gbit/in2 storage density fabricated using nanoimprint lithography and read with proximal probe", Appl. Phys. Lett. 71(21), Nov. 24, 1997, pp. 3174–3176.

Stephen Y. Chou, "Patterned Magnetic Nanostructures and Quantized Magnetic Disks", Proceedings of the IEEE, vol. 85, No. 4, Apr. 1997, pp. 652–671.

Fauchet, et. al., "Light–Emitting Porous Silicon: Materials Science, Properties, and Device Applications", IEEE Journal of Selected Topics in Quantum Electronics, vol. 1, No. 4, Dec. 1995, pp. 1126–1139.

*Primary Examiner*—Leszek Kiliman
*Attorney, Agent, or Firm*—McGinn & Gibb, P.C.

[57] ABSTRACT

A storage device and a method of forming a storage device, includes depositing a metal layer on a substrate, and oxidizing the metal layer to form an oxide with a rutile structure on which a ferromagnetic material is selectively grown. The substrate may be substantially formed of either $SiO_2$, $Si_3N_4$, or a compound of $SiO_2$ and $Si_3N_4$. In another method, a method of forming a magnetic device, includes one of seeding a surface with one of Ti, Sn, and Ru islands having nanometer dimensions, and by exposing nanometer scale areas of the one of Ti, Sn, and Ru on a substrate, and coating the one of Ti, Sn, and Ru, with a ferromagnetic material. The surface may be substantially formed of either $SiO_2$, $Si_3N_4$, or a compound of $SiO_2$ and $Si_3N_4$. Similarly, the substrate may be substantially formed of either $SiO_2$, $Si_3N_4$, or a compound of $SiO_2$ and $Si_3N_4$.

34 Claims, 5 Drawing Sheets

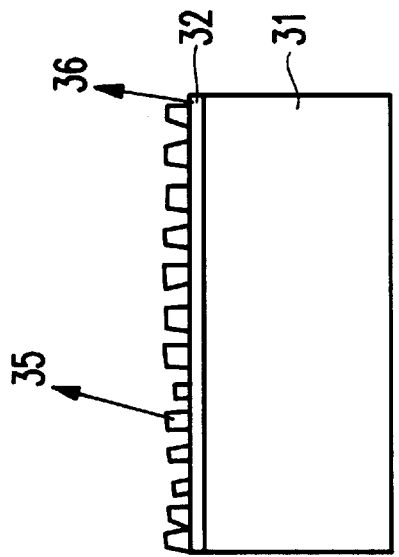
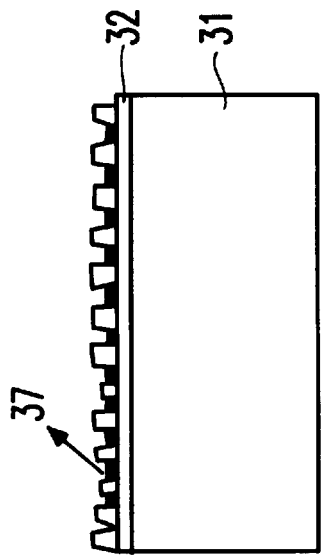
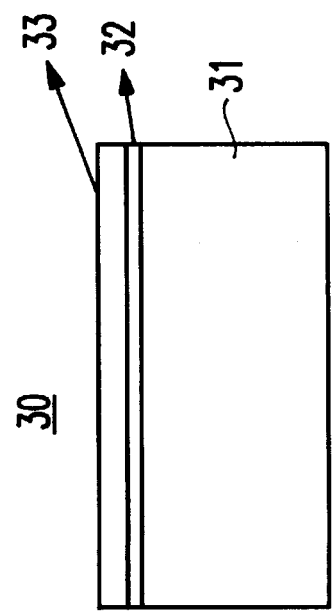
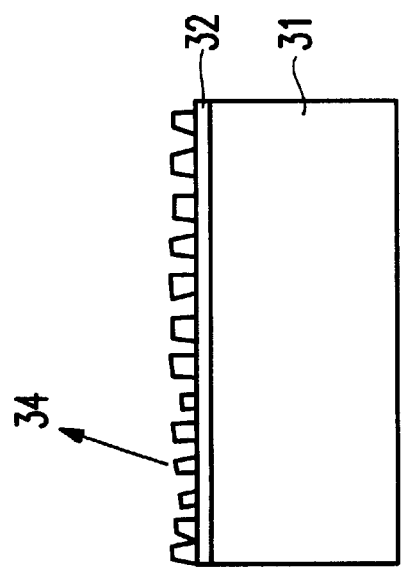
FIG. 3A
FIG. 3B
FIG. 3C
FIG. 3D

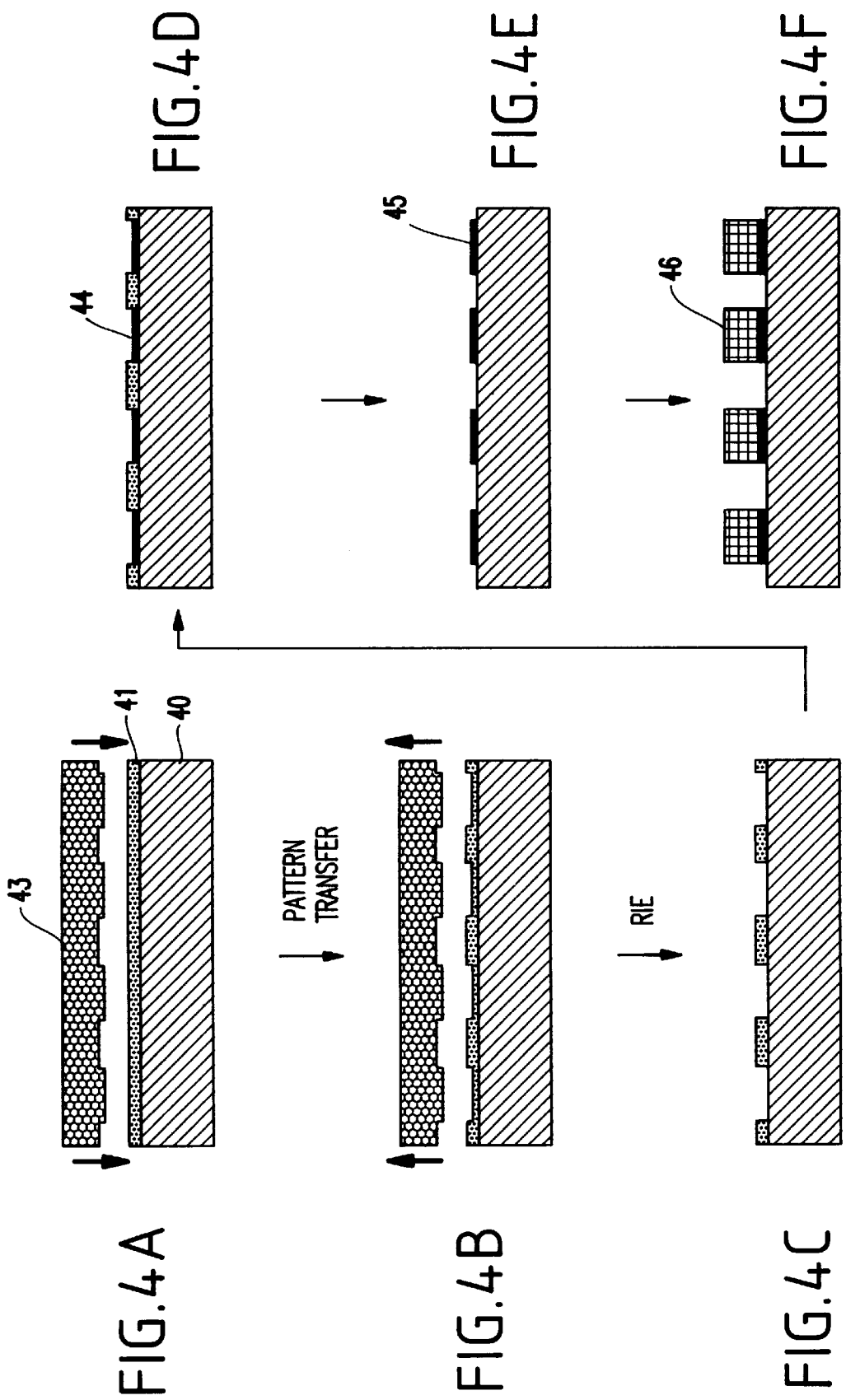

HIGH DENSITY MAGNETIC RECORDING MEDIUM UTILIZING SELECTIVE GROWTH OF FERROMAGNETIC MATERIAL

CROSS-REFERENCE TO RELATED APPLICATION

The present application is related to U.S. patent application Ser. No. 09/172,659 filed on Oct. 15, 1998, to Nestor A. Bojarczuk et al., now pending, entitled "SELECTIVE GROWTH OF FERROMAGNETIC FILMS FOR MAGNETIC MEMORY, STORAGE-BASED DEVICES, AND OTHER DEVICES", assigned to the present assignee, and incorporated herein by reference.

BACKGROUND OF THE INVENTION

1. Field of the Invention

The present invention generally relates to a magnetic recording medium, and more particularly to a recording medium utilizing selective growth of a ferromagnetic material such as chromium dioxide ($CrO_2$).

2. Description of the Related Art

Conventional hard disk drive storage media includes a thin (typically 20–30 nm), continuous magnetic film, such as CoPtCr alloy, deposited on a rigid substrate. The commonly-used substrates for thin film disks are Al—Mg alloy plated with A NiP layer, or glass. The data is represented by a bit of a storage element in the media, determined by the orientation of the longitudinal magnetization in a region of approximately $4.0 \times 0.15$ mm$^2$ (for 1 Gbit/in$^2$ areal density). Each of these bits consists of polycrystalline grains of average size 15–20 nm. The grains are partially isolated in order to break the magnetic exchange coupling between them. This is often accomplished by depositing the magnetic layer on top of a Cr underlayer with a columnar structure consisting of voided grain boundaries. The magnetic layer takes on the morphology of the underlayer, thereby resulting in the decoupling of the magnetic grains.

In other cases, segregation of Cr to form non-magnetic Cr-rich grain boundaries also helps in magnetically decoupling the grains. The grains in the magnetic films have a broad distribution in the size and shape, with random crystalline orientations.

For high density longitudinal recording, it is necessary to make the recording medium thin and highly coercive. This is because the demagnetization in the medium not only decreases the remanent magnetization, but also rotates the magnetization vector to establish a circular magnetization mode (*Magnetic Recording*, Vol. 1: *Technology*, by C. D. Mee and E. D. Daniel, McGraw Hill Book Company, New York, 1987). Reducing the film thickness prevents the circular magnetization from establishing.

Furthermore, to increase the storage density capacity of the media by decreasing the bit cell, the size of the individual grains must be decreased to keep the number of grains in a bit cell constant at approximately 500–1000 grains.

Without this scaling, the magnetic signal-to-noise ratio (SNR) would increase substantially due to the random orientation of the magnetic easy axis of each grain and their size distribution. Thus, a factor of two scaling leads to a factor of four improvement in areal density, but simultaneously requires a factor of eight reduction in volume resulting in a similar decrease in the magnetic energy stored per grain.

As the grains become very small and weakly coupled to the neighboring grains, the magnetization energy becomes comparable to the thermal energy resulting in loss of the written data due to random thermal switching of the magnetization direction. This thermal switching limits the achievable areal density that the recording medium can support and is usually referred to as the "superparamagnetic limit" (B. Cullity, *Introduction to Magnetic Materials*, Addison-Wesley Publishing, Reading, Mass. (1972), Chapter 11.6).

It has been estimated that the superparamagnetism will limit the storage density for the currently used (e.g., conventional) magnetic media at about 40 Gbit/in$^2$. Other limiting factors for recording density are the transition width between two recorded bits determined by the width of the domain walls, side tracks caused by fringing fields of the write head, and density loss in the media required to allow for tracking.

Alternative recording approaches are being considered to further increase the recording density of the media. One approach uses perpendicular recording where the media is magnetized perpendicular to the surface of the disk using materials, such as CoCr alloys, which possess a very strong vertical magnetocrystalline anisotropy. A medium with perpendicular magnetization can in principle exhibit sharp transitions between regions of opposite magnetization because the internal demagnetizing field approach zero near the transition. If the entire film thickness can be magnetized in the perpendicular direction, then high density recording is possible for thick films (e.g., 0.1–1 mm, as compared to thickness of 20–30 nm for longitudinal recording). Thus, since the thickness of the media for perpendicular recording is larger than that for longitudinal recording, the volume per magnetic grain can be correspondingly larger. It has been estimated that a factor of 2–4 increase in areal density may be possible with perpendicular recording before the superparamagnetic limit is reached.

Much larger improvements in areal density are expected, both for longitudinal and perpendicular recording, if every bit cell is isolated and corresponds to a single magnetic domain consisting of a number of polycrystalline grains, as shown in FIG. 1. Specifically, FIG. 1 illustrates a magnetic disk 10 having longitudinal $CrO_2$ magnetic bits 11.

As shown, in the ultimate limit, the magnetic media includes discrete, single-domain magnetic elements uniformly distributed on the surface of the nonmagnetic disk. Each magnetic element has a uniform, well-defined shape at a specific location, with two stable magnetization directions of equal magnitude representing the binary bits. The size and shape of the elements determine the magnetic field needed to switch the magnetization direction. Since the writing process in a single domain media requires flipping (e.g., switching) the magnetization direction of a discrete bit, it results in much lower noise and lower error rate with correspondingly high density. Furthermore, the transition noise between bits is very small and has significantly reduced cross talk. Tracking also is considerably simplified because of the isolation of each bit.

However, unlike conventional disks, fabrication of one bit per cell media requires photolithographic definition of each grain. More particularly, for single domain elements which have a 50–100 nm size, nanofabrication techniques are essential (e.g., see P. R. Krauss and S Y. Chou, *J. Vac. Sci. Technol.* B 13, 2850 (1995); S. Y. Chou and P. R. Krauss, *J. Magnetism and Magnetic Materials,* 155, 151 (1996); S. Y. Chou, *Proc. IEEE* 85, 652 (1997)). Nanofabrication techniques have been used to produce ultra-high density storage elements based on single domain elements with a storage density of about 65 Gbit/in$^2$.

However, nanolithographic techniques, such as x-ray and e-beam lithography, are very slow and prohibitively expensive processes which preclude their usage for mass manufacturing of magnetic disks.

To meet the high throughput and low cost requirement for fabricating patterned magnetic nanostructures, Chou et al. (P. R. Krauss and S. Y. Chou, *Appl. Phys. Lett.,* 71, 3174 (1997)) have demonstrated a nanoimprint lithography technique for producing sub-10 nm features by replication.

The process involves creating a resist relief pattern by deforming the resist's physical shape with embossing. In one of the imprint methods used by Chou et al., the resist is a thermoplastic polymer which is heated during the imprint to soften the polymer relative to the mold. The polymer becomes a viscous liquid and can flow above the glass-transition temperature of the polymer, and therefore can be deformed readily to the shape of the mold. Nano-compact disks with 400 Gbit/in$^2$ storage density have been fabricated using this technique. Similar recording densities are expected for magnetic storage media using single domain magnetic structures patterned using nanoimprint lithography.

Chromium dioxide ($CrO_2$) is widely used as a particulate magnetic recording medium in tapes (e.g., see D. J. Craik, *Magnetic Oxides,* John Wiley & Sons (1975), Chapter 12.). The $CrO_2$ particles are acicular and are comparatively clean and free of dendrites, unlike $\gamma$-$Fe_2O_3$ particles which also are used as particulate media.

Consequently, the $CrO_2$ particles are relatively easily dispersed and oriented, and can be used to form magnetic tape which has excellent short wavelength response. The material has a room temperature saturation moment ($M_s$) of 90–100 emu/g as compared with 74 emu/g for $\gamma$-$Fe_2O_3$. By varying the additives and processing conditions, $CrO_2$ particles have been produced having coercivities from less than about 100 Oe to more than about 650 Oe. Because of the higher moment and orientation and greater coercivity, larger output signals at low densities are possible.

Since $CrO_2$ is a metastable phase, it normally has to be synthesized at high oxygen pressures (500–3000 atmospheres). While this can be quite readily accomplished in the case of bulk synthesis, it has proved to be an impediment for the growth of high quality films. This is because conventional vacuum deposition techniques, such as evaporation and sputtering, usually operate at low pressures.

There have been some reports of $CrO_2$ films growth at atmospheric pressures by chemical vapor deposition using $CrO_3$ as a precursor (e.g., see S. Ishibashi, T. Namikawa and M. Satou, Mat. Res. Bull. 14, 51 (1979)). However, reproducible growth of single phase material has been limited to a very narrow window of process conditions. More particularly, it has been suggested that a substrate temperature very close to 390° C. is necessary for single phase growth, and a temperature increase or decrease of even 10° C. results in formation of secondary phases. Additionally, the growth has been limited to single crystal substrates of sapphire and $TiO_2$ substrates.

SUMMARY OF THE INVENTION

In view of the foregoing and other problems of the conventional structures and methods, it is an object of the present invention to provide a structure and method for producing high quality $CrO_2$ films.

Another object of the present invention is to use chemical vapor deposition (CVD) in growing $CrO_2$ as a thin film magnetic recording medium.

Yet another object is to selectively grow the $CrO_2$ material on certain (e.g., predetermined) surfaces of a substrate, thereby allowing fabricating magnetic media which include discrete, single-domain $CrO_2$ magnetic elements uniformly distributed on the surface of a nonmagnetic disk for ultrahigh density recording.

In one aspect of the invention, a method is provided for using the technique for selective area growth, as described in U.S. patent application Ser. No. 09/172,659, entitled "SELECTIVE GROWTH OF FERROMAGNETIC FILMS FOR MAGNETIC MEMORY, STORAGE-BASED DEVICES, AND OTHER DEVICES", now pending, commonly assigned with the present application, isolated $CrO_2$ particles can be created of dimensions of tens of nanometers or less, on an appropriate (selected) substrate surface.

In a first aspect of the present invention, a method of forming a magnetic storage media includes one of seeding a $SiO_2$ surface with Ti islands of nanometer dimensions, and by exposing nanometer scale areas of Ti on a $SiO_2$-based (or $Si_3N_4$-based or $SiO_2$ and $Si_3N_4$ compound) substrate. The nanometer-scaled exposed Ti seed surfaces are created by one of evaporation and using porous silicon thin films.

Hence, with the invention, a method of producing high quality $CrO_2$ films is provided in which chemical vapor deposition (CVD) of $CrO_2$ is employed to produce a thin film, magnetic recording medium.

Further, the $CrO_2$ material can be selectively grown on certain surfaces of a substrate, thereby allowing fabricating magnetic storage media which include discrete, single-domain $CrO_2$ magnetic elements uniformly distributed on the surface of a nonmagnetic disk for ultrahigh density recording.

Another advantage is that the conventional method of patterning films using photolithography and etching is difficult in the case of $CrO_2$ since it is not readily etched in a reactive plasma plasma or wet chemicals. Hence, selective growth is a preferred approach for fabricating $CrO_2$ magnetic storage media since it requires no subsequent patterning steps.

BRIEF DESCRIPTION OF THE DRAWINGS

The foregoing and other objects, aspects and advantages will be better understood from the following detailed description of preferred embodiments of the invention with reference to the drawings, in which:

FIGS. 3(*a*)–3(*d*) are cross-sectional views showing exposing nanometer scale areas of Ti on a $SiO_2$-based substrate according to another preferred method of the present invention;

FIGS. 4(*a*)–4(*f*) are cross-sectional views showing using a mold for producing patterned disks on which $CrO_2$ is selectively deposited according to another preferred method of the invention.

DETAILED DESCRIPTION OF PREFERRED EMBODIMENTS OF THE INVENTION

Figure 1:
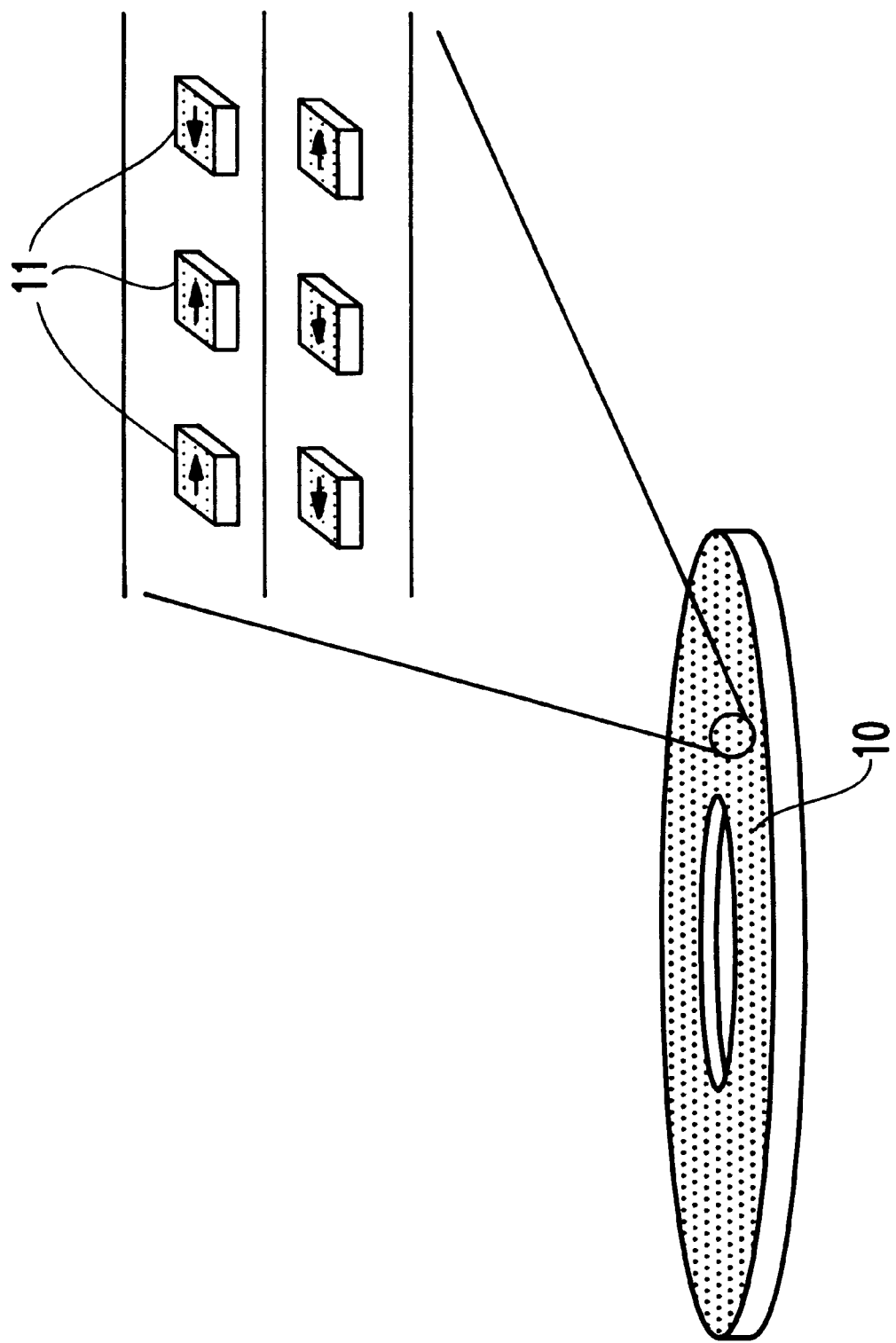
FIG. 1 is a schematic diagram of a magnetic recording disk showing isolated $CrO_2$ recording bits.

Referring now to the drawings, and more particularly to FIGS. 2(*a*)–5, preferred embodiments of the present invention will be described.

Generally, with the invention, by seeding a $SiO_2$ (or $Si_3N_4$ or $SiO_2$ and $Si_3N_4$ compound) surface with Ti (e.g., Ti is given throughout the examples below, but the invention will work equally well with Sn, Ru, and the like) islands of nanometer dimensions (e.g., as shown in FIGS. 2(a)–2(d)), or by exposing nanometer scale areas of Ti on a $SiO_2$-based (or $Si_3N_4$-based or $SiO_2$ and $Si_3N_4$ compound) substrate (e.g., as shown in FIGS. 3(a)–3(d)), an appropriate substrate surface according to the present invention can be produced. Such nanometer-scaled exposed Ti seed surfaces may be created either by evaporation (or sputtering), according to a first embodiment of the invention, or via the use of porous silicon thin films, according to a second embodiment of the present invention. The details of these methods are described below.

After one of the above procedures is followed to produce an appropriate substrate surface, the exposed Ti surfaces may be easily oxidized to $TiO_2$. Then, using the concept of selective area growth, a ferromagnetic material such as $CrO_2$ may be deposited on top of such a substrate, such that the $CrO_2$ deposits form only upon the nanoscale $TiO_2$ surface, and not on the adjoining $SiO_2$ surface. Hence, a nanostructured storage element for magnetic storage applications is produced. Sn or Ru could also be deposited in place of Ti and then subsequently oxidized to form $SnO_2$ or $RuO_2$, respectively.

These individual storage bit elements include essentially single magnetic domain $CrO_2$ grains that have formed on the $TiO_2$ seed surfaces. The size of the $CrO_2$ bits will be dictated by the size of the $TiO_2$ seed surfaces, and the amount of $CrO_2$ deposition.

For example, for an approximate 10 nm $CrO_2$ bit size, with an average spacing between bits (e.g., as represented by adjacent islands) of about 10 nm, the storage density of $CrO_2$ magnetic media will amount to about 1 Tbit/in$^2$, as compared to 24 Gbit/in$^2$ density of conventional magnetic storage media. Since the formation of the $TiO_2$ seed surfaces is random, there will be some amount of interconnection between them. Hence, not all of the $CrO_2$ grains will be isolated perfectly from each other. However, even assuming that 10% of the domains are isolated, a memory density of 100 Gbit/in$^2$ still can be provided, which is well above the density of the conventional magnetic storage media mentioned above.

The $CrO_2$ grains also may be deposited on a deliberately patterned substrate (e.g., patterned to nanoscale dimensions by electron beam lithography or the like), thereby to ensure isolation and a well-defined pattern for the bits. However, this is prohibitively expensive for an application such as the one described above.

In contrast, random nucleation surfaces of $TiO_2$ may be easily formed via evaporation (the Ti can also be deposited by sputtering), or porous Si formation and in this case, such "nano-surface" templates can be produced on surfaces such as polymer tapes.

Hereinbelow, the method of making nanostructured $CrO_2$ domains on a surface is described using two methods according to first and second embodiment, respectively, of the invention.

First Embodiment (Using Ti evaporation:)

In a first embodiment, as shown in FIGS. 2(a)–2(d), a substrate 21 such as a silicon wafer 20 is provided having a thickness within a range of about 100 μm to about 10000 μm. The substrate is not limited to silicon wafers, but could be a polymeric media, a metal, or the like. The choice of silicon is made only for convenience of explanation.

Figure 2A:
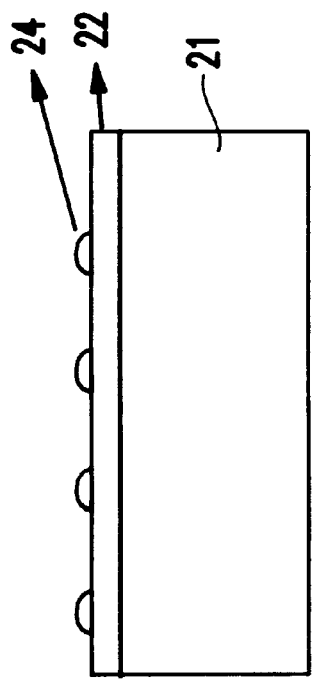
FIGS. 2(*a*)–2(*d*) are cross-sectional views showing seeding a surface (e.g., $SiO_2$) with islands (e.g., formed by Ti or the like) of nanometer dimensions according to a preferred method of the invention.

As shown in FIG. 2(a), the Si surface is coated with a thin layer of $SiO_2$ having a thickness greater than about 100 nm in thickness. If the thickness is below 100 nm, as long as a continuous film is formed on the substrate, it is sufficient.

Figure 2B:
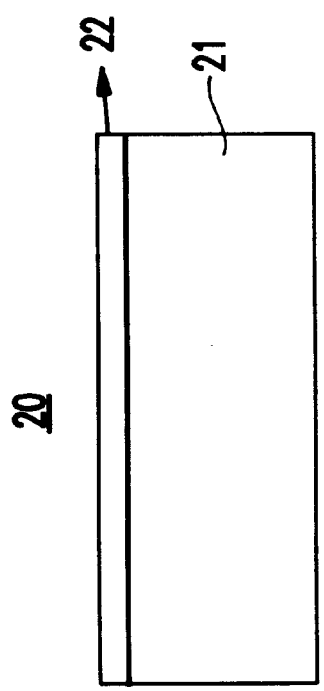

Thereafter, as shown in FIG. 2(b), the wafer 20 is inserted into a vacuum chamber equipped with a Ti evaporation source which is quite commonly known in the art. A small amount of Ti (e.g., equivalent to 1–2 monolayers of Ti deposition, a commonly recognized thickness) is performed on the Si wafer in the vacuum chamber. Since only a very small amount of Ti is delivered, the Ti deposits on the Si surface in the form of small, isolated islands 23. The size of each island is approximately equal to the diffusion length of Ti on the $SiO_2$ surface, and can be controlled by the surface temperature of the $SiO_2$.

For example, if the $SiO_2$ is at room temperature, the island size will be of the order of about 10 nm to about 50 nm. The height of the islands will be proportional to the amount of Ti deposited. For example, if 1–2 monolayers of Ti is deposited, the heights of the islands will be less than about 10 monolayers assuming 25% coverage of the surface occurs. Preferably, excess Ti is not delivered, since then the islands will grow and coalesce resulting in a continuous Ti film. Preferably, the film is discontinuous, since then isolated oxide domains may be formed on them. The islands can typically be separated by an average distance that is on the order of their dimensions.

If the islands are too far apart, then the coverage of $CrO_2$ will be limited, and thus the achievable recording density will be limited. If the islands are too close together, then the islands will coalesce and form bigger islands. The point at which coalescence occurs will also depend on the effective thickness (time of growth) of the $CrO_2$.

Figure 2C:
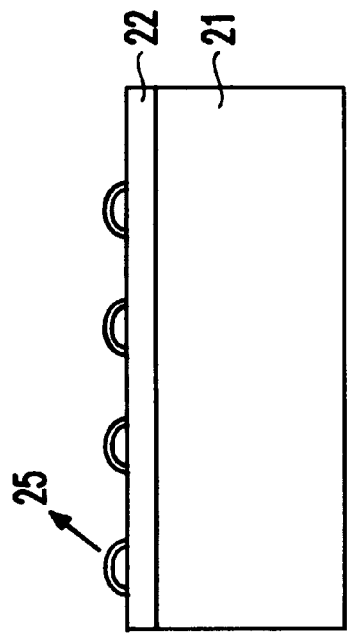

Following Ti evaporation, as shown in FIG. 2(c), the wafer 20 is removed from the vacuum chamber, and then is inserted into a $CrO_2$ deposition reactor. Then, the substrate is heated to approximately 400 C in an oxygen atmosphere for about 60 minutes, to oxidize the Ti to $TiO_2$ 24.

Figure 2D:
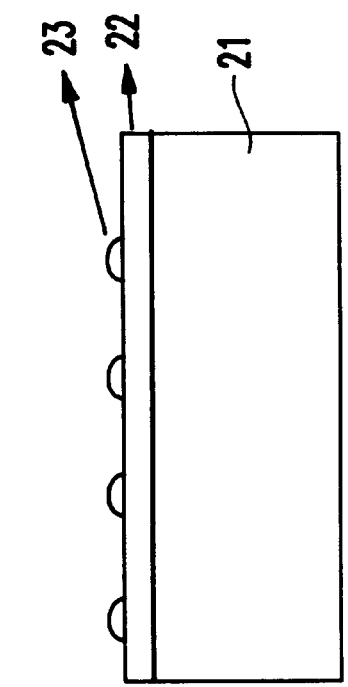

Then, as shown in FIG. 2(d), selective growth on the $TiO_2$ 24 is performed. Specifically, the $CrO_2$ 25 deposition is performed in the exact manner as described in U.S. patent application Ser. No. 09/172,659, filed on Oct. 15, 1998, to Nestor A. Bojarczuk et al., now pending, entitled "SELECTIVE GROWTH OF FERROMAGNETIC FILMS FOR MAGNETIC MEMORY, STORAGE-BASED DEVICES, AND OTHER DEVICES".

Again, only about 1–2 monolayers of $CrO_2$ 25 is deposited, to form nanoscale-sized islands on top of the $TiO_2$ nucleation seeds 24. If excess $CrO_2$ is deposited (i.e., delivery of approximately about 5 monolayers or more), then the $CrO_2$ nuclei will grow in size and will be excessively large.

Figure 5:
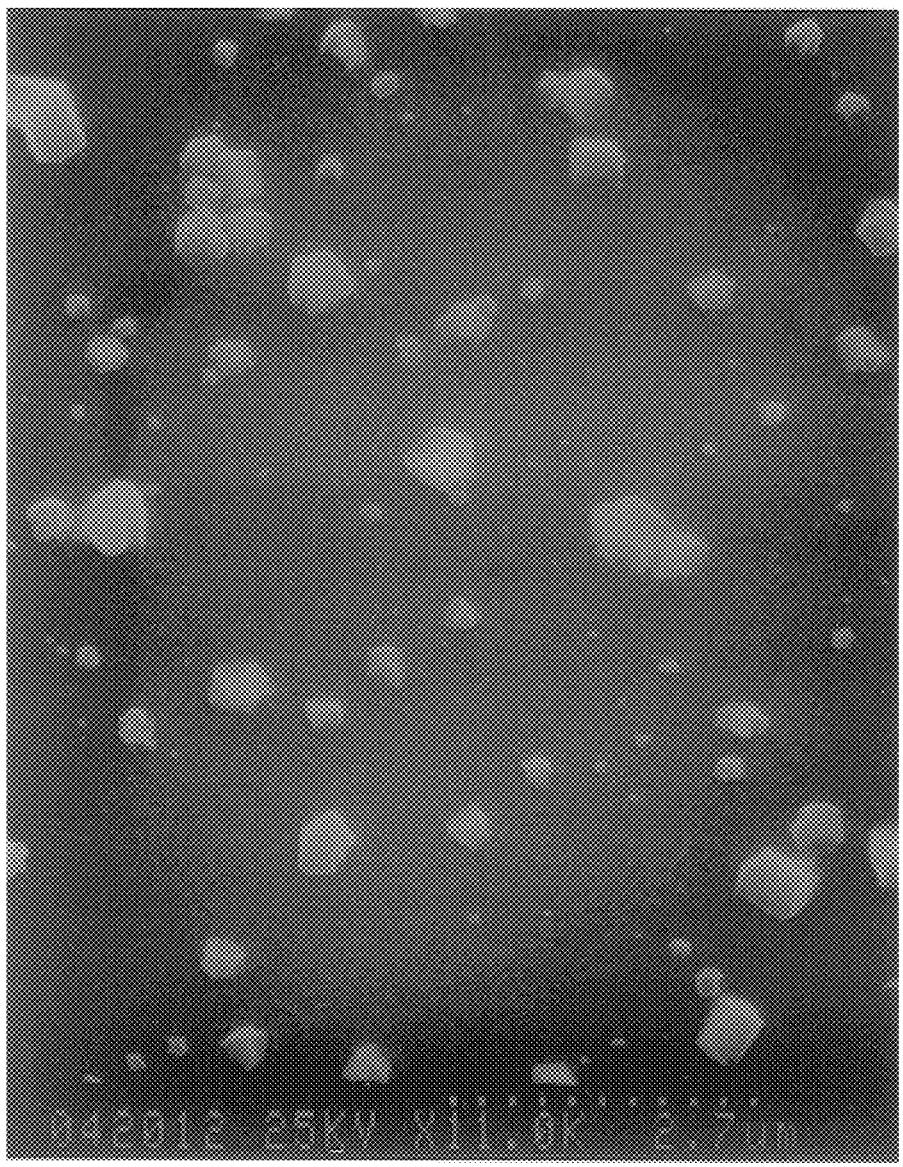
FIG. 5 is a scanning electron micrograph (SEM) illustrating the results when excess $CrO_2$ is deposited and $CrO_2$ nuclei grow to an excessively large size.

An example of the resulting structure is shown in the SEM of FIG. 5. In this case, a top of a Si wafer was provided with approximately 500 nm of $SiO_2$ deposited thereon. Then, a Ti deposition, equivalent to 0.5 nm (~2 monolayers) was performed on top of this wafer to create the $CrO_2$ nuclei seeds.

Thereafter, in the manner described above, approximately 500 nm of $CrO_2$ was deposited. The $CrO_2$ deposition was clearly excessive. As can be seen from the SEM micrograph of FIG. 5, this resulted in a distribution of isolated $CrO_2$ nuclei on the wafer surface, illustrating the success of the experiment. While no growth occurred on the $SiO_2$ surface, as expected, the $CrO_2$ nuclei formed a large distribution of lateral sizes (e.g., from ~40 nm to ~450 nm) due to the excess $CrO_2$ deposition. However, the SEM of FIG. 5 clearly verifies the formation of nanometer-scaled isolated $CrO_2$ particles on the surface.

The advantages of the first embodiment include the selective growth of $CrO_2$, leading to higher densities of magnetic storage elements. By tuning the growth parameters (particularly temperature), it may be possible to influence the shape of the $CrO_2$ nuclei. The resulting shape anisotropy will influence the coercivity (the magnetic field needed to switch the magnetization direction) of these grains which is important for the recording media.

Second Embodiment (Using porous Si)

The technique for making nanostructured films using porous silicon, according to the second embodiment of the present invention, is shown in the cross-sectional view of FIGS. 3(a)–3(d).

First, as shown in FIG. 3(a), a conducting silicon wafer 30 is provided having a conducting substrate 31, and a relatively thin Ti film 32 having a thickness substantially within a range of about 10 nm to about 1000 nm, and more preferably about 50 nm, is vacuum-deposited on top of the conducting substrate 31. The Ti film's thickness should be large enough, so that a uniform, continuous layer is formed, rather than islands (e.g., discontinuous areas) as described above in the first embodiment. The Ti 32 may be deposited either by using a thermal evaporation source for the Ti or a sputtering source. On top of the Ti layer 32, a silicon layer 33, preferably having a thickness within a range of about 20 nm to 1000 nm, and most preferably about 500 nm thick, is deposited again using a standard deposition technique such as vacuum evaporation of Si, vacuum sputtering, or chemical vapor deposition (CVD).

Then, as shown in FIG. 3(b), the Si layer 33 is converted to porous silicon 34 using well-known procedures and techniques (e.g., see P. M Fauchet, L. Tsybeskov, C. Peng, S. P. Duttagupta, J von Behren, Y Kostoulas, J M V Vandyshev, K D. Hirschman, *IEEE J. Sel. Top. Quantum Electron.* 1, 1126 (1995)). The Si wafer is used as an anode in an electrochemical cell with a metal cathode and a 25% HF solution as the electrolyte. A current density of about 10 $mA/cm^2$ is used in the electrochemical cell for anodization of the Si layer 33 which, as a result, converts to a porous microstructure with porous features of dimensions within a range of about 5–10 nm.

The porous Si 34 stops at the Ti surface 32, and as a result of the porosity, Ti surfaces with lateral dimensions within a range of about 5–10 nm are now exposed.

Then, as shown in FIG. 3(c), the porous Si and the Ti surfaces 32, 33 are oxidized to $SiO_2$ 35 and $TiO_2$ 36 by heating the wafer in a heating chamber to a temperature within a range of substantially between about 700 C to about 1000 C, and most preferably 750 C in the presence of $H_2O$ vapor.

After oxidation, as shown in FIG. 3(d), the template is ready for nanostructured $CrO_2$ deposition. Then, $CrO_2$ 37 is deposited onto this wafer in the manner described in U.S. patent application Ser. No. 09/172,659, filed on Oct. 15, 1998, to Nestor A. Bojarczuk et al., now pending, entitled "SELECTIVE GROWTH OF FERROMAGNETIC FILMS FOR MAGNETIC MEMORY, STORAGE-BASED DEVICES, AND OTHER DEVICES", with the nominal equivalent of 1–2 monolayers of $CrO_2$ deposition.

As a result, $CrO_2$ islands of nanometer-scale embedded in the $SiO_2$ porosities by virtue of the selective area deposition behavior of $CrO_2$.

The advantages of the second embodiment include producing high quality $CrO_2$ films in which chemical vapor deposition (CVD) of $CrO_2$ is employed to produce a thin film magnetic recording medium. The $CrO_2$ material can be selectively grown on certain surfaces of a substrate, thereby allowing fabricating magnetic media which include discrete, single-domain $CrO_2$ magnetic elements uniformly distributed on the surface. Furthermore, the magnetic elements are embedded in nonmagnetic $SiO_2$ to provide magnetic isolation.

It is noted that to produce a recording medium where each magnetic element has a uniform, well-defined shape at a specific location, the nanoimprint lithography technique, described by Chou et al. above, may be employed and as shown in FIGS. 4(a)–4(f).

In such a method, a substrate 40 (e.g., formed of silicon or the like) has a resist 41 formed thereon. A metallic or insulating mold 42 of the pattern is fabricated in advance using high resolution e-beam or x-ray lithography and reactive ion etching (RIE).

Then, as shown in FIG. 4(a), the master mold 40 can be replicated to produce patterned disks on which $CrO_2$ is selectively deposited as shown in FIG. 4(f).

The mold 40 is imprinted into the resist film 41 on the disk substrate (e.g., silicon 40 or the like) using the procedure detailed by Chou et al., and as shown in FIG. 4(b).

In FIGS. 4(c)–4(d), an anisotropic reactive ion etching process allows the imprinted pattern to be transferred through the entire resist 41's thickness. Then, the resist template is used to transfer the pattern into thin Ti (e.g., 1–2 nm) using a lift-off process.

The resist is removed, and patterned Ti islands 44 are subsequently oxidized (e.g., to form $TiO_2$ 45) by heating in oxygen (or air) at 400–500 C, as shown in FIG. 4(e).

Finally, in FIG. 4(f), $CrO_2$ 46 is selectively grown on the patterned $TiO_2$ islands to produce an ultrahigh density recording medium.

With the unique and unobvious aspects, features, and methods of the present invention, high quality $CrO_2$ films are produced in which chemical vapor deposition (CVD) of $CrO_2$ is employed to produce a thin film magnetic recording medium. Further, the $CrO_2$ material can be selectively grown on certain surfaces of a substrate, thereby allowing fabricating magnetic media which include discrete, single-domain $CrO_2$ magnetic elements uniformly distributed on the surface of a nonmagnetic disk for ultrahigh density recording.

The second embodiment described above is preferred since it allows for exact definition of the size and shape of the $CrO_2$ elements at predetermined locations. However, a drawback is that the second embodiment involves additional processing steps as compared to the first embodiment.

While the invention has been described in terms of several preferred embodiments, those skilled in the art will recognize that the invention can be practiced with modification within the spirit and scope of the appended claims.

Having thus described our invention, what we claim as new and desire to secure by Letters Patent is as follows:

1. A method of forming a storage device, comprising:

depositing a metal layer on a substrate; and oxidizing said metal layer to form an oxide with a crystalline structure on which a ferromagnetic material is selectively grown.

2. The method according to claim 1, wherein said metal layer comprises one of Ti, Sn, and Ru.

3. The method according to claim 2, wherein said ferromagnetic material comprises $CrO_2$.

4. The method according to claim 1, wherein said ferromagnetic material comprises $CrO_2$.

5. A method of forming a magnetic device, comprising:
one of seeding a $SiO_2$ surface with Ti islands having nanometer dimensions, and by exposing nanometer scale areas of Ti on a $SiO_2$-based substrate;
oxidizing said Ti to form $TiO_2$, thereby forming a template for the selective growth of a ferromagnetic material; and
coating said $TiO_2$ with said ferromagnetic material.

6. The method according to claim 5, wherein said ferromagnetic material comprises $CrO_2$.

7. The method according to claim 5, wherein said nanometer-scaled exposed Ti seed surfaces are created by one of evaporation of Ti and using porous silicon thin films on a continuous thin Ti film.

8. The method according to claim 7, wherein said porous silicon thin films are oxidized to form $SiO_2$.

9. The method according to claim 5, wherein said ferromagnetic material comprises $CrO_2$, wherein said coating comprises selective growing $CrO_2$ on top of said substrate, such that the $CrO_2$ deposits form only upon the nanoscale $TiO_2$ surface, thereby forming a nanostructured magnetic storage element.

10. The method according to claim 5, wherein said ferromagnetic material comprises $CrO_2$, and
wherein an individual storage bit element of said device includes a substantially single magnetic domain $CrO_2$ grain that has formed on the $TiO_2$ seed surface, a size of the $CrO_2$ bit depending upon a size of the $TiO_2$ seed surface, and an amount of $CrO_2$ deposition.

11. The method according to claim 5, wherein said ferromagnetic material comprises $CrO_2$, wherein for an approximate 10 nm $CrO_2$ bit size, with an average spacing between bits of about 10 nm, a storage density of said $CrO_2$ magnetic media is within a range of about 100 Gbit/in$^2$ to about 1 Thit/in$^2$.

12. The method according to claim 5, wherein $CrO_2$ grains are deposited on said substrate having been patterned in advance, thereby to isolate bits of said device,
said substrate being patterned to nanoscale dimensions by electron beam lithography.

13. The method according to claim 5, wherein random nucleation surfaces of $TiO_2$ are formed by one of evaporation and porous Si formation.

14. A method for forming a magnetic device, comprising:
coating a surface of a substrate with $SiO_2$ having a thickness greater than about 100 mn in thickness;
inserting said substrate into a vacuum chamber;
depositing Ti on said substrate so as to form Ti deposits on the Si surface as isolated islands, a size of each island being approximately equal to a diffusion length of Ti on the $SiO_2$ surface, and controlled by a surface temperature of the $SiO_2$;
oxidizing said Ti to form $TiO_2$; and
selectively growing a ferromagnetic material on the $TiO_2$, thereby to form nanoscale-sized islands on top of the $TiO_2$.

15. The method according to claim 14, wherein said substrates comprises one of a polymeric media, metal, and silicon, and wherein said $SiO_2$ has a thickness preferably within a range of thicknesses from 10 nm to about 1000 nm, and more preferably a thickness of 200 nm.

16. The method according to claim 14, wherein said depositing of Ti includes depositing an amount of Ti equivalent to no more than about 2 monolayers of Ti deposition,
wherein with the $SiO_2$ at room temperature, the island size is of the order of about 10 nm to about 50 nm, and a height of the islands is proportional to the amount of Ti deposited.

17. The method according to claim 16, wherein if no more that about 2 monolayers of Ti is deposited, heights of the islands will be less than about 10 monolayers with about 25% coverage of the surface.

18. The method according to claim 14, wherein said Ti film is discontinuous.

19. The method according to claim 14, wherein said ferromagnetic material comprises $CrO_2$, and
wherein said oxidizing includes inserting said substrate into a $CrO_2$ deposition reactor, and heating said substrate to approximately 400 C for about 60 minutes, to oxidize the Ti.

20. The method according to claim 14, wherein said ferromagnetic material comprises $CrO_2$, and
wherein no more than about 2 monolayers of $CrO_2$ are deposited.

21. A method of making a nanostructured film for a magnetic device, comprising:
depositing a Ti film on a surface of a conducting substrate;
depositing a silicon layer on top of the Ti layer;
converting the silicon layer to porous silicon with porous features, wherein said porous silicon stops at the Ti surface, thereby exposing Ti surfaces;
oxidizing said porous Si and the Ti surface to form $SiO_2$ and $TiO_2$ by heating the substrate; and
depositing a ferromagnetic material onto said oxidized silicon and titanium, to form ferromagnetic material islands of nanometer-scale embedded in the $SiO_2$ porosities by selective area deposition behavior of said ferromagnetic material.

22. The method according to claim 21, wherein said porous features have dimensions within a range of about 5–10 nm, and said Ti surfaces have lateral dimensions within a range of about 5–10 nm,
wherein said silicon layer, having a thickness within a range of about 10 nm to 1000 nm, and more preferably a thickness of about 500 nm thick, is deposited by one of vacuum evaporation of Si, vacuum sputtering, and chemical vapor deposition (CVD).

23. The method according to claim 21, wherein a thickness of said Ti film is sufficient so that a uniform layer is deposited, said Ti film being deposited by one of using a thermal evaporation source and a sputtering source.

24. The method according to claim 21, wherein said substrate is heated to a temperature within a range of substantially between about 700° C. to about 1000° C., and most preferably 750° C. in the presence of $H_2O$ vapor.

25. The method according to claim 21, wherein said ferromagnetic material comprises $CrO_2$, and
wherein said $CrO_2$ layer has a thickness of within a range of about 1 to 2 monolayers of $CrO_2$ deposition.

26. A method of forming a magnetic device, comprising:
one of seeding a surface with one of Ti, Sn, and Ru islands having nanometer dimensions, and by exposing nanometer scale areas of said one of Ti, Sn, and Ru on a substrate;
oxidizing said one of Ti, Sn, and Ru to form one of $TiO_2$, $SnO_2$, and $RuO_2$, thereby forming a template for the selective growth of a ferromagnetic material; and
coating said one of $TiO_2$, $SnO_2$, and $RuO_2$, with said ferromagnetic material.

27. The method according to claim 26, wherein said surface comprises one of $SiO_2$, $Si_3N_4$, and a compound of $SiO_2$ and $Si_3N_4$ compound, and wherein said substrate comprises a substrate substantially formed of one of $SiO_2$, $Si_3N_4$, and a compound of $SiO_2$ and $Si_3N_4$.

28. The method according to claim 26, wherein said ferromagnetic material comprises $CrO_2$.

29. A method of making a nanostructured film for a magnetic device, comprising:

depositing one of a Ti, Sn, and Ru film on a surface of a conducting substrate;

depositing a silicon layer on top of the one of the Ti, Sn, and Ru layer;

converting the silicon layer to porous silicon with porous features, wherein said porous silicon stops at the one of the Ti, Sn, and Ru surface, thereby exposing the one of the Ti, Sn, and Ru surfaces;

oxidizing said porous Si and the one of the Ti, Sn, and Ru surface to form $SiO_2$ and one of $TiO_2$, $SnO_2$, and $RuO_2$, by heating the substrate; and depositing a ferromagnetic material onto said oxidized silicon and said one of $TiO_2$, $SnO_2$, and $RuO_2$, to form ferromagnetic material islands of nanometer-scale embedded in the $SiO_2$ porosities by selective area deposition behavior of said ferromagnetic material.

30. A storage device, comprising:

a metal oxide layer deposited on a substrate, said metal oxide layer having a crystalline structure; and a ferromagnetic material selectively grown on said metal oxide layer.

31. The storage device according to claim 30, wherein said metal oxide layer comprises one of $TiO_2$, $SnO_2$, and $RuO_2$.

32. The storage device according to claim 30, wherein said ferromagnetic material comprises $CrO_2$.

33. The storage device according to claim 31, wherein said ferromagnetic material comprises $CrO_2$.

34. The storage device according to claim 30, wherein said substrate comprises a substrate substantially formed of one of $SiO_2$, $Si_3N_4$, and a compound of $SiO_2$ and $Si_3N_4$.

* * * * *